United States Patent [19]

Lyons

[11] Patent Number: 5,123,168
[45] Date of Patent: Jun. 23, 1992

[54] PRACTICAL HEAVY DUTY HEDGE, BUSH AND BRUSH CUTTER WITH ATTACHED THICK LIMB CUTTING MEANS AND DUAL-SIDED TINE SETS FOR HOLDING BRUSH BEING CUT

[76] Inventor: William E. Lyons, 44D Friars Gate, Twin Lakes, Clifton Park, N.Y. 12065

[21] Appl. No.: 788,590

[22] Filed: Nov. 6, 1991

[51] Int. Cl.⁵ .................. B23D 57/02; B23D 59/00; B25F 3/00; B23B 29/00
[52] U.S. Cl. ........................... 30/382; 30/124; 30/371; 30/383
[58] Field of Search .............. 30/371, 381, 382, 383, 30/384, 385, 386, 387, 389, 390, 122, 124; 83/745

[56] References Cited

U.S. PATENT DOCUMENTS

| | | | |
|---|---|---|---|
| 3,711,946 | 1/1973 | Troutman | 30/124 |
| 3,808,684 | 5/1974 | Ludwig | 30/371 |
| 3,815,229 | 6/1974 | Granberge | 30/124 |
| 4,142,292 | 3/1979 | Ulrich | 30/122 |
| 4,317,285 | 3/1982 | Graham | 30/382 |
| 4,748,745 | 6/1988 | Woodbridge | 30/383 |

Primary Examiner—Douglas D. Watts
Assistant Examiner—Paul M. Heyrana, Sr.
Attorney, Agent, or Firm—Charles W. Helzer

[57] ABSTRACT

A practical and safe heavy duty hedge, bush and brush cutter having a forwardly mounted dual-sided tine set that comprises a means for readily cutting flexible heavier limbs. The forwardly mounted tine set preferably is part of a comb-like attachment which includes a number of additional dual-sided tine sets that define a plurality of gathering, holding and cutting areas. The attachment is designed so that it can be mounted from one side of a conventional chain saw blade without removing the chain blade from the chain guide and yet provides stopping surfaces on both sides of the guide bar and chain blade of the saw to support severed limbs and branches in such a manner that bias cutting of flexible limbs and shredding of branches is prevented. The comb-like attachment including the dual-sided tine sets defining the gathering, holding and cutting areas for branches to be cut can be installed and removed from one side of the chain saw blade without the use of special techniques or tools.

22 Claims, 1 Drawing Sheet

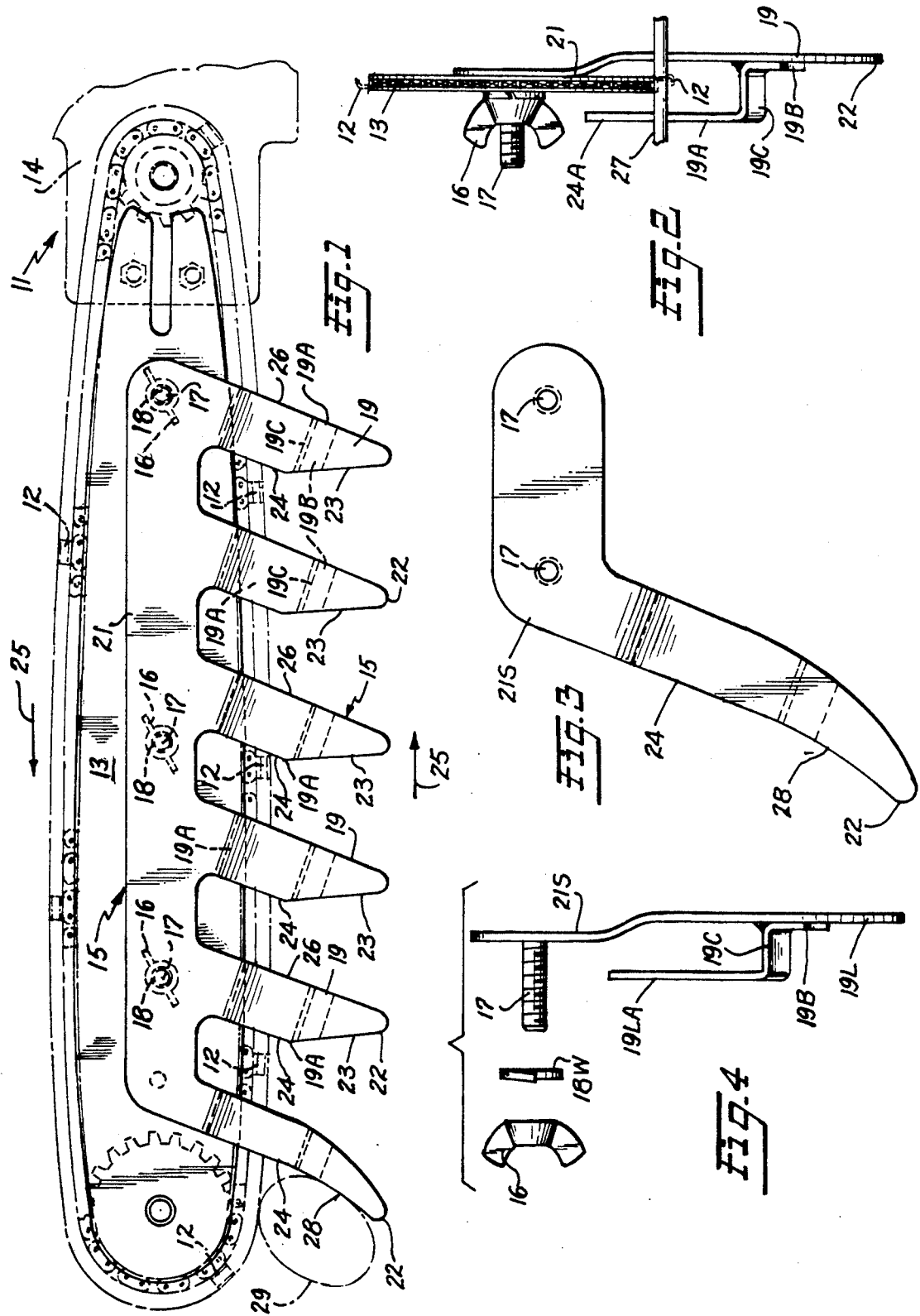

PRACTICAL HEAVY DUTY HEDGE, BUSH AND BRUSH CUTTER WITH ATTACHED THICK LIMB CUTTING MEANS AND DUAL-SIDED TINE SETS FOR HOLDING BRUSH BEING CUT

FIELD OF INVENTION

This invention relates to a combined chain saw of conventional commercially available construction (either gasoline engine or electric motor driven) and an attachment therefor for readily and easily adapting the chain saw for use in cutting hedges, bushes and brush as well as thick limbs in a safe, reliable and easily executed manner. The attachment can be secured to the chain saw in the field (or removed) easily and quickly without requiring any special expertise or tools. After removal of the attachment from a chain saw, the chain saw can again be used in the normal manner without impairment of its operating characteristics.

BACKGROUND OF INVENTION

U.S. Pat. No. 4,142,292 - issued Mar. 6, 1979 - for "Chain Saw Adapter for Use Particularly for Trimming Hedges and Cutting Brush", Ray R. Ulrich - inventor, describes a comb-like attachment for conventional chain saws which includes a plurality of dividers for dividing hedge and brush members to be trimmed into groupings and during operation gathers the groupings into narrow cutting areas for holding and cutting by the teeth of the chain saw.

The chain saw adapter of Ulrich has not received widespread commercial acceptance seemingly for a number of reasons. The first reason is that it is difficult, time consuming and somewhat dangerous to install on a chain saw and requires the use of certain tools such as wrenches, pliers and the like. The design of the attachment is such that a narrow enclosed open pathway is provided through two legs of an attachment which are pinned together at the ends of the tines defining a comb-like structure. This design makes it difficult and somewhat hazardous to being cut by the sharp teeth of the chain saw as the attachment is being secured to (or removed from) the chain saw. Secondly, hedges and brush do not grow in nice orderly fashion as regards branch size (diameter). One can be trimming along at a good rate, then have to stop because a branch for some reason is much larger in size and will not conveniently fit in between the tines of the comb-like adapter. It then becomes necessary for the user to get out another separate tool just to take care of the larger size branches.

To overcome these disadvantages, and provide a practical heavy duty hedge, brush and brush trimmer, the present invention was devised.

SUMMARY OF INVENTION

The invention provides a practical heavy duty hedge and brush cutter which includes the combination of a conventional chain saw with a comb-like attachment having a plurality of tine sets which provide spaced-apart holding and stopping surfaces that define an open channel therebetween in which the chain guide and chain blade of the chain saw are disposed. The stopping surfaces of the spaced-apart, tine sets form an acute angle at a gathering, holding and cutting area with respect to the line of travel of the chain saw cutting blade.

To overcome the problem of encountering heavier limbs while operating the hedge and brush cutter, a forward or leading (relative to the direction of movement of the chain blade) tine set is provided that forms an enlarged holding and stopping area in conjunction with the line of travel of the chain blade. The purpose of this forward or lead tine set, which defines an enlarged gathering and stopping area, is to grasp and hold with its two sides larger limbs which then can be cut by the chain saw without allowing the limb to be cut along a bias or shredded. Thus, the dual-sided nature of the tine set acts as a bias cut preventer since it supports the limb or branch being cut on both sides of the chain saw cutting blade. This feature appears also on additional tine sets of the comb-like attachment; however, because the spacing between the additional tine sets is not sufficient to accommodate larger or thicker limbs, the cutting of such larger, thicker limbs is done with the forward-most tine set of the attachment.

Another feature of the invention is the provision of a smaller attachment having only a separate, forwardly mounted dual-sided tine set for use when cutting trees under conditions where it is necessary to eliminate low, flexible branches in order to get at the trunk of a tree. With this invention it is possible to reach out and sever the flexible branches without having the branches whip back at the operator. Addition of the single forward tine set does not impede the use of the chain saw in its usual cutting position for severing the trunk of the tree. The single, forward dual-sided tine set does not impede the use of the saw in a conventional manner, but in reality is a safety feature that makes the chain saw much safer to use in cutting flexible branches than is presently possible using conventional chain saws without the flexible limb grasping and holding capability provided by the attachment.

From the above brief description, it will be appreciated that the invention provides a practical, heavy duty hedge and brush cutter having a forwardly mounted, dual-sided tine set which has large limb holding capability that provides a means for readily cutting flexible, heavier limbs. In preferred embodiments of the invention the forwardly mounted tine set is part of a comb-like attachment which includes a number of additional, spaced-apart, dual-sided tine sets that define a plurality of gathering areas for the branches of shrubs, hedges and brush. The structure is designed so that it can be mounted from one side of the chain blade of a conventional chain saw, without requiring the chain blade to be removed from the guide bar; and yet provides stopping surfaces on both sides of the guide bar and chain blade of the saw to support severed limbs and branches in a manner which prevents bias cutting and shredding of the limbs and branches being cut. The design is such that the comb-like attachment comprised by the dual-sided tine sets defining the gathering and cutting areas can be installed and removed from one side of the chain saw blade without the need for tools or special expertise. Hence, the attachment readily may be mounted or removed by an operator in the field.

The comb-like structure with dual-sided tine sets defining the gathering and cutting areas can be securely mounted on the guide bar of a conventional chain saw by means of thru-bolts stud welded to the attachment and inserted through holes formed in the guide bar. The holes either may be pre-drilled by the guide bar manufacturer or drilled by owners of existing chain saws who prefer to drill such mounting holes rather than buy a new guide bar when they purchase the attachment. The holes thus provided and the thru-bolts are so located that the attachment may be mounted on the chain saw from one side without the need for passing the blade lengthwise through a double set of tines and then installing bolts, lock washers and nuts with tools. The provision of the forwardly mounted dual-sided tine set with enlarged gathering area as the forward-most, lead tine set (relative to the direction of movement of the chain blade) provides an enlarged gathering and holding area for cutting larger limbs and decreases substantially the danger of cutting flexible limbs with a chain saw. As a consequence, the chain saw with the attachment of the invention when used by a competent operator is a safer chain saw to operate than chain saws which do not include such an attachment.

BRIEF DESCRIPTION OF DRAWINGS

The above and other objects, features and many of the attendant advantages of this invention will be appreciated more readily as the same becomes better understood from a reading of the following detailed description when considered in connection with the accompanying drawings, wherein like parts in each of the several figures are identified by the same reference characters, and wherein:

FIG. 1 is a side elevational view of a combination chain saw and comb-like attachment secured to the side of the guide bar of a chain saw according to the invention;

FIG. 2 is an end elevational view of the embodiment of the invention shown in FIG. 1;

FIG. 3 is a side elevational view of a single, dual-sided lead tine set structural attachment for use on the leading or forward end of the chain guide of a chain saw and constructed according to the invention; and FIG. 4 is front end view of the single, dual-sided, lead tine set structural attachment shown in FIG. 3.

BEST MODE OF PRACTICING THE INVENTION

FIG. 1 is a side elevational view of a practical heavy duty hedge, bush and brush cutter with attached thick limb cutting means according to the invention. The improved hedge and brush cutter shown in FIG. 1 is comprised by a conventional, portable chain saw shown generally at 11 and may be either gasoline engine driven or electric motor driven. The chain saw includes a chain blade 12 and a guide bar 13 around which the chain blade 12 of the saw rotates in a direction shown by arrow 25 and is driven by motor drive means (either gasoline engine or electric motor) 14 for rotating chain blade 12 at cutting speeds.

The improved hedge and brush cutter further includes a novel, readily fitted, comb-like attachment shown generally at 15. Attachment 15 easily can be secured to the chain guide 13 of the chain saw by an operator using the cutter in the field by means of wing nuts 16 and thru-bolts 17 secured to attachment 15 by stud welding. The thru-bolts 17 are inserted through circular openings 18 preformed in the guide bar 13 of the chain saw either at the time of manufacture of the guide bar or subsequently by an owner who may choose to drill the mounting holes 18 in an existing guide bar rather than buy a new guide bar with the attachment. Preferably, lock washers such as shown at 18W are used with the wing nuts 16 to secure attachment 15 to the guide bar of the chain saw.

FIG. 2 considered in conjunction with FIG. 1 illustrates the construction of the tine sets 19 which make up the comb-like attachment 15. The main or front portion of the tine sets are comprised by a tooth-like tine 19 integrally formed on an axially extending body portion 21 of the comb-like structure 15. As best seen in FIG. 2, the first tooth-like tines 19 are bent outwardly a preset distance from the plane of body portion 21 so as to be spaced away from and parallel to the plane of the guide bar 13 to which body portion 21 of comb-like structure 15 is attached by mounting studs 17 secured to body portion 21 by stud welding.

On the backside of each of the tooth-like tines 19 (as viewed by the reader) an anti-bias cut means is provided by a member 19A secured at an outwardly disposed point along the axial length of each of the tines 19. The back side members 19A extend parallel to the main tooth-like tines 19 but in an opposite direction so as to enclose the chain blade 12 on the side thereof opposite from the tines 19. Members 19A are secured to their respective front, tooth-like tines 19 by a mounting bracket portion 19B and extending arm portion 19C. 19C extends substantially at right angles to the backside tine portion 19A and the mounting bracket portion 19B, and serves to position the backside member 19A outwardly away from its respective main tooth-like tine 19 by a distance of about twice that of the outward spacing of the main tine 19 from the plane of the guide bar 13.

From the foregoing description it will be seen that each of the tines 19 and their respective anti-bias cut backside members 19A form a two-sided tine set (hereinafter referred to as 19, 19A) that comprise the comb-like structure 15. The free tip end 22 of each of the main, tooth-like tines 19 extend downwardly below the lower edge of guide bar 13 and path of chain blade 12. The point of connection of the mounting brackets 19B to each of the main tooth-like tines 19 is well below the bottom edge of guide bar 13 and the lower part of blade 12 as best seen in FIG. 2. Hence, the chain blade 12 is able to rotate freely about the guide bar 13 in the usual manner of a chain saw within the space defined between the tooth-like tines 19 and their respective backside members 19A of each tine set 19, 19A..

The tooth-like tines 19 are generally rounded at their lower free tip end 22 as best shown in FIG. 1 with the rounded tip ends 22 tapering off into a sloping, straight, leading edge portion 23 that terminates in a straight stopping edge portion 24. Stopping edge portion 24 is shaped to form an acute angle with the lower edge of the guide bar 13 and the line of travel of the chain blade 12. The combination of the surfaces 22, 23 and 24 of each tine set 19, 19A in conjunction with the trailing edge 26 of the next adjacent tine set serves to divide the branches of hedges and brush being cut into groups of branches. The group of branches are held in place for cutting between the coacting adjacent tine sets due to the coaction of the stopping surface formed by the acute angle between leading edge portion 24 and the chain blade 12 and the trailing edge of the preceding tine set.

FIG. 2 illustrates how the front, tooth-like tines 19 and their backside members 19A coact to hold a branch of a hedge, bush or brush, such as 27, at two points along its length so that it cannot be twisted due to the cutting action of the chain blade 12 within this space. As a result, a clean, straight-through cut is obtained without bias cutting and shredding along the length of the branches as a result of the bias cut preventing action of the coacting tine tooth-like tine 19 stopping surface portion 24 and a corresponding stopping surface portion 24A of backside member 19A.

During operation, the embodiment of the invention shown in FIG. 1 is used by raking the comb-like attachment 15 horizontally across the branches of a hedge or brush being cut at a chosen depth. This raking action will cause the brush or hedge branches to be divided into groups between the several tine sets 19, 19A with the branches 27 of the hedge or brush being grasped firmly between the two parts of the tine sets 19, 19A. This action in conjunction with the movement of the chain blade 12 in the direction of arrow 25 will cause the branches 27 to be forced against the stopping surfaces 24 and 24A of the respective tine sets 19, 19A where they are grasped by the two sides of the respective tine sets, and held while being cut by the chain blade 12. Continuous moving in a horizontal plane of the comb-like attachment 15 in the manner of a comb will allow the cutter to trim the hedge or brush to a desired height with very little difficulty, and without excessive shaking of the branches of the hedge or brush or cross bias cutting and shredding.

As best seen in FIG. 1 considered in conjunction with FIG. 4, the leading or first tine set 19L, 19LA encountered by the chain blade 12 in its rotational path around chain guide 19 has a different configuration from the remaining tine sets 19, 19A in the comb-like attachment 15 shown in FIG. 2. The leading dual-sided tine set 19L, 19LA has a concave gathering surface 28 which tapers upwardly from the rounded free tip end 22 and terminates in the tapered, straight stopping surface 24 of tine set 19L, 19LA and forms an acute angle with the line of travel of the chain blade 12 and bottom edge of chain guide 13. This concave surface 28 on tine set 19L, 19LA defines an enlarged gathering and holding area between the convex holding surface 28 on the leading edge of tine set 19L, 19LA in conjunction with the chain blade 12 as it comes around the rounded leading end of guide bar 13. This allows lead tine set 19L, 19LA to grasp and hold larger diameter branches such as shown at 29, which might be encountered while cutting the hedges and brush, but which are too large to fit within the spaced-apart tine sets 19, 19A that comprise the comb-like attachment 15.

It should be noted that the tine sets 19, 19A may have either a straight or convex surface leading edge which serve to push the branches such as 27 of a brush or hedge being cut into the gathering and holding areas between the several tine sets. Larger branches such as 29 would not slide between these more closely spaced tine sets. Hence, prior to this invention under conditions where larger branches 29 were encountered, the hedge cutter would have to be set aside and a separate tool such as a chain saw without the attachment used to cut such larger diameter branches such as 29. To obviate such situations, the leading tine set 19L, 19LA is provided with the concave tapered leading surface forming an acute angle with the path of the travel of the chain blade 12. This provides a greatly enlarged gathering and holding space between the leading tine set and the chain path for accommodating larger branches such as 29.

The leading tine set 19L, 19LA includes a backside, anti-bias cutting member 19LA as shown in FIG. 4, for example, which provides the two-sided grasping of even the larger branches such as 29 in the same manner as shown in 27 in FIG. 2. With the larger branch 29 thus held between the two sides of the lead tine set 19L, 19LA, the operator of the chain saw gradually lowers the chain blade into engagement with the topside of the branch 29 and can safely cut it without the branch being shaken or wiggled substantially or lashing back at him during the cutting operation.

If desired, in place of the comb-like attachment 15 shown in FIG. 1 having the leading tine set 19L, 19LA formed on the front end thereof as an integral part of the comb-like attachment, a single, leading tine set 19L, 19LA can be used in its place as shown in FIGS. 3 and 4 of the drawings. The single leading tine set attachment shown in FIGS. 3 and 4 can best be used where it is desired to trim rather substantial branches, such as those around the base of a tree, in order to expose the trunk and then use the remainder of the chain saw body between the motor drive means that drives the chain blade and the trailing edge of the leading tine set 19L, 19LA to cut down the tree in the normal manner of a chain saw. For use in this manner, the leading, tine set 19L and 19LA is formed on a shortened body portion 21S shown in FIG. 3 having a pair of mounting bolts 17 stud welded in place on the shortened body portion 21S. The attachment thus comprised then can be mounted on the leading or tip end of the guide bar 13 in a manner similar to that shown in FIG. 1, but would not include the remaining comb-like tine sets 19, 19A of the preferred embodiment of the invention shown in FIG. 1. To assure that the attachment such as shown in FIG. 1 or in FIGS. 3 and 4 is not easily vibrated during operation, lock washers such as shown at 18W are used while mounting the attachment in place on the guide bar of a chain saw as described previously.

COMMERCIAL APPLICABILITY

The combined chain saw of conventional, commercially available construction (either gasoline engine or electric motor driven) and attachment therefor for readily and easily adapting the chain saw for use in cutting hedges and brushes as well as thick limbs in a safe, reliable and easily executed manner makes it possible for a single chain saw to be used safely not only in felling trees and cutting up lumber into short lengths, but also for trimming hedges, bushes and brush and larger diameter, flexible limbs of trees and saplings. The invention greatly expands the number of uses to which a chain saw can be applied, while at the same time enhancing its safe operation. The improved features are obtained at very little additional cost and without in any way impairing the primary function of the chain saw since the attachment can be secured to the chain saw in the field (or removed therefrom) easily and quickly without requiring any special expertise or tools.

Having described two embodiments of a practical heavy duty hedge, bush and brush cutter with attached thick limb cutting means and dual-sided tine sets for holding brush being cut constructed according to the invention, other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. A practical heavy duty safe hedge and brush cutter with attached thick limb cutting means including in combination a conventional portable chain saw having a chain blade and guide bar assembly around which the chain blade of the saw is rotated by motor drive means for rotating the chain blade at cutting speeds;

said hedge and brush cutter further including a readily fitted attachment secured to the chain guide of the saw for grasping and holding relatively thick limbs;

said attachment comprising a forwardly mounted lead tine set that straddles the chain blade and extends outwardly beyond the edge of the guide bar and chain blade, said lead tine set comprising a tooth-like tine and a spaced-apart, bias cut preventer means that extends substantially parallel to said tooth-like tine portion and in conjunction therewith encloses the chain blade and a portion of the guide bar and allows for free travel of the chain blade therebetween;

both said tooth-like tine portion and said bias cut preventer means being first encountered by the chain blade in the direction of travel thereof after the chain blade passes the rounded free end of the guide bar; and said lead tine set and the chain blade defining an enlarged gathering, holding and cutting area therebetween for relatively thick limbs while being held and cut by the chain blade.

2. A safe hedge and brush cutter according to claim 1 wherein said readily fitted attachment further includes a plurality of additional spaced apart tine sets that form a comb like structure defining a plurality of gathering and holding areas for the branches of hedges, bushes and brush between the tine sets while being cut;

the tine sets providing a plurality of spaced-apart stops that extend beyond and straddle the guide bar and chain blade to act as stops and bias cut preventers.

3. A safe hedge and brush cutter according to claim 2 wherein the additional spaced-apart tine sets that form the comb-like attachment all have the leading edges thereof form an acute angle with the line of travel of the chain blade for acting in conjunction with the chain saw blade to form a plurality of different gathering, holding and cutting areas for branches of the hedge, bush or brush being cut.

4. A safe hedge and brush cutter according to claim 3 wherein all of the tine sets have an elongated main tooth-shaped tine with a pointed end terminated in a rounded gathering surface on the leading edge of the tooth-shaped tine and the bias cut preventer means of the tine set comprises an elongated member that is secured to and projects outwardly away from the first main tooth-shaped tine and is bent to extend in a direction parallel to the main tooth-shaped tine, the elongated member and the main tooth-shaped tine having a space therebetween to allow for passage of the guide bar and chain blade therebetween, the attachment thus comprised being capable of being installed and removed from one side of the chain saw without the use of special tools or techniques and without requiring removal of the chain blade from the guide bar.

5. A safe hedge and brush cutter according to claim 4 wherein the attachment is mounted in holes on the guide bar which are either pre-drilled by the guide bar manufacturer or drilled by the owner of the chain saw upon the attachment being initially mounted on the guide bar of a chain saw.

6. A safe hedge and brush cutter according to claim 5 wherein the motor drive means comprises an internal combustion engine.

7. A safe hedge and brush cutter according to claim 5 wherein the motor drive means comprises an electric motor.

8. A safe hedge and brush cutter according to claim 1 wherein the motor drive means comprises an internal combustion engine.

9. A safe hedge and brush cutter according to claim 1 wherein the motor drive means comprises an electric motor.

10. A practical and safe heavy duty hedge and brush cutter including in combination a conventional portable chain saw having a chain blade and guide bar assembly around which the chain blade of the saw is rotated by motor drive means for rotating the chain blade at cutting speeds; and said hedge and brush cutter further including a readily fitted comb-like attachment secured to the chain guide which includes a plurality of spaced-apart tine sets that form a comb-like structure defining a plurality of gathering, holding and cutting areas for the branches of hedges, bush and brush while being cut with the tine sets providing stops on both sides of the chain guide and chain blade to act both as stopping means and bias cut preventer means.

11. A safe hedge and brush cutter according to claim 10 wherein the spaced-apart tine sets that form the comb-like attachment all have the leading edges thereof form an acute angle with the line of travel of the chain blade for acting in conjunction with the chain saw blade to define a plurality of different gathering, holding and cutting areas for branches of the hedge, bush or brush being cut.

12. A safe hedge and brush cutter according to claim 11 wherein all of tine sets have a first main tine portion shaped in the form of an elongated tooth with a pointed end terminated in a rounded gathering surface on the leading edge of the first main tine portion and a second member secured to and projecting outwardly away from the first main tine portion on the backside thereof and then extending in a direction parallel to the tooth-shaped first tine portion with a space between the backside member and the main tooth-like tine portion to allow for passage of the guide bar and chain blade therebetween and to act as a bias cut preventer means, the attachment thus comprised being capable of being installed and removed from one side of the chain saw without the use of special tools or techniques.

13. A safe hedge and brush cutter according to claim 12 wherein the attachment is mounted in holes on the guide bar which are either pre-drilled by the guide bar manufacturer or drilled by the owner of the chain saw upon the attachment being initially mounted on the guide bar of a saw.

14. A safety attachment for a chain saw having a guide bar and chain blade assembly to which the attachment readily can be fitted without requiring special tools or mounting techniques;

said attachment comprising a forwardly mounted, tine set that extends outwardly beyond the edge of the guide bar and chain blade and has a leading edge that is first encountered by the chain blade in the direction of travel thereof and forms an acute angle with the edge of the guide bar and line of travel of the chain blade;

said tine set having a main tooth-shaped tine acting in conjunction with the chain blade to define an enlarged gathering, holding and cutting area for thicker limbs; and said tine set further including bias cut preventer means spaced apart from and parallel to at least a portion of said tooth-shaped main tine and coacting therewith to form a set of spaced-apart stops which extend beyond the chain blade on both sides of the guide bar and chain blade to act both as stopping means and bias cut preventer means.

15. A safety attachment according to claim 14 wherein the attachment further includes a plurality of additional spaced-apart tine sets that form a comb-like structure defining a plurality of gathering, holding and cutting areas for the branches of hedges, bush and brush being cut with the tine sets providing stops on both sides of the chain guide and chain blade to act as combined stopping means and bias cut preventer means.

16. A safety attachment according to claim 15 wherein the additional two-sided, spaced-apart tine sets that form the comb-like attachment all have the leading edges thereof form an acute angle with the line of travel of the chain blade for acting in conjunction with the chain saw blade to form a plurality of different gathering, holding and cutting areas for branches of the hedge, bush or brush being cut.

17. A safety attachment according to claim 16 wherein all of the two-sided tine sets have a main tine shaped in the form of an elongated tooth with a pointed end terminating in a gathering surface on the leading edge of the tooth-like main tine and a bias cut preventer and second stopping member secured to and projecting outwardly away from the tooth-like tine and then extending in a direction parallel to the tine with a space between the tine and the bias cut preventer and stopping member to allow for passage of the guide bar and chain blade therebetween, the attachment thus comprised being capable of being installed and removed from one side of the chain saw without the use of special tools or mounting techniques.

18. A safety attachment according to claim 17 wherein the attachment is mounted in holes on the guide bar which are either pre-drilled by the guide bar manufacturer or drilled by the owner of the chain saw upon the attachment being initially mounted on the guide bar of a saw.

19. A safety attachment for a chain saw having a chain guide and chain blade assembly to which the attachment readily can be fitted without requiring special tools or techniques;
said attachment comprising a plurality of two-sided, spaced-apart tine sets that form a comb-like structure defining a plurality of gathering, holding and cutting areas for the branches of hedges, bush and brush while being cut with the two-sided tine sets providing stops on both sides of the chain guide and chain blade to act both as stopping and bias cut preventer means.

20. A safety attachment according to claim 19 wherein the two-sided, spaced-apart tine sets that form the comb-like attachment all have the leading edges thereof form an acute angle with the line of travel of the chain blade for acting in conjunction with the chain blade to form a plurality of different gathering, holding and cutting areas for branches of the hedge, bush or brush being cut.

21. A safety attachment according to claim 20 wherein all of the tine sets have a main elongated tooth-shaped tine with a pointed end terminated in a gathering surface on the leading edge and a stopping and bias cut preventer member secured to and projecting outwardly away from the main tooth-like tine and then extending in a direction parallel to the first tooth-like tine with a space between the two to allow for passage of the guide bar and chain blade therebetween and to act as a combined stopping and bias cut preventer means, the attachment thus comprised being capable of being installed and removed from one side of the chain saw without the use of special tools or mounting techniques.

22. A safety attachment according to claim 21 wherein the attachment is mounted in holes on the guide bar which are either pre-drilled by the guide bar manufacturer or drilled by the owner of the chain saw upon the attachment being initially mounted on the guide bar of a saw.

* * * * *